United States Patent
Greenspan et al.

(10) Patent No.: US 9,979,757 B1
(45) Date of Patent: May 22, 2018

(54) METHOD AND APPARATUS FOR PROVIDING A MEDIA CONTENT FROM A COLLABORATIVE MEETING TO A REMOTE USER

(71) Applicant: CA, Inc., Islandia, NY (US)

(72) Inventors: Steven L. Greenspan, Scotch Plains, NJ (US); Howard A. Abrams, San Mateo, CA (US)

(73) Assignee: CA, Inc., New York, NY (US)

( * ) Notice: Subject to any disclaimer, the term of this patent is extended or adjusted under 35 U.S.C. 154(b) by 241 days.

(21) Appl. No.: 13/792,437

(22) Filed: Mar. 11, 2013

(51) Int. Cl.
*G06F 15/16* (2006.01)
*H04L 29/06* (2006.01)
*G06F 21/64* (2013.01)

(52) U.S. Cl.
CPC .......... *H04L 65/403* (2013.01); *G06F 21/645* (2013.01)

(58) Field of Classification Search
CPC .............. H04L 65/403; H04L 12/1827; H04L 12/1822; H04L 47/24; H04L 51/046; H04L 67/02; H04L 67/42; H04L 12/1813; H04L 67/12; H04L 67/142; H04L 67/28; H04L 67/2823; G06F 21/645; G06Q 10/1095
See application file for complete search history.

(56) References Cited

U.S. PATENT DOCUMENTS

| | | | |
|---|---|---|---|
| 8,091,029 B1* | 1/2012 | Gay et al. ..................... | 715/734 |
| 8,484,288 B2* | 7/2013 | Lakshmanan et al. ....... | 709/204 |
| 2007/0036370 A1* | 2/2007 | Granovetter .......... | G06F 17/289 381/311 |
| 2007/0165625 A1* | 7/2007 | Eisner ..................... | G06F 9/546 370/389 |
| 2008/0112336 A1* | 5/2008 | Gray ..................... | H04M 3/562 370/260 |
| 2012/0203845 A1* | 8/2012 | Lakshmanan et al. ....... | 709/206 |
| 2012/0221644 A1* | 8/2012 | Karniely ....................... | 709/204 |
| 2012/0226997 A1* | 9/2012 | Pang .............................. | 715/753 |
| 2013/0111362 A1* | 5/2013 | Alexandrov et al. ......... | 715/753 |
| 2014/0132701 A1* | 5/2014 | Wang et al. ............... | 348/14.08 |

* cited by examiner

*Primary Examiner* — Chirag R Patel
*Assistant Examiner* — Rachel J Hackenberg

(57) ABSTRACT

According to an example computer-implemented method, a first client on a proxy server joins a collaborative meeting on behalf of a user. The collaborative meeting is hosted on a first meeting platform, and the first client utilizes the first meeting platform. The first client receives media content from the collaborative meeting on behalf of the user. The proxy server transmits the received media content to a second client on a computing device of the remote user that utilizes a different, second meeting platform. A computing device and computer program product implementing similar features are also disclosed.

29 Claims, 11 Drawing Sheets

METHOD AND APPARATUS FOR PROVIDING A MEDIA CONTENT FROM A COLLABORATIVE MEETING TO A REMOTE USER

TECHNICAL FIELD

The present disclosure relates to collaborative meeting software, and more particularly to a proxy server configured to join a collaborative meeting on behalf of a user, and provide media content from the collaborative meeting to the user.

BACKGROUND

Collaborative meeting software has risen in popularity in recent years. Some examples of collaborative meeting software platforms include WEBEX, GOTOMEETING, and LIVE MEETING. Collaborative meeting software is often used to share the desktop of a presenter to a plurality of viewers, so that some media content can be presented, such as a slide-based presentation. In a typical configuration, one or more participants are designated as "presenters" and can advance a presentation, while the remaining participants are "viewers" who passively receive media content from the collaborative meeting. Collaborative meetings also may include an audio component where presenters provide speech data to accompany their presentation. However, each of these platforms requires use of their own specific client for participating in a given meeting, and some of these clients will not work properly on different terminal devices or through some firewall configurations. Moreover, each collaboration tool may require an application or web browser plugin download for their respective client, which may be problematic for some users, and may present browser compatibility issues.

SUMMARY

According to one aspect of the present disclosure, a computer-implemented method comprises joining, by a first client on a proxy server, a collaborative meeting on behalf of a user. The collaborative meeting is hosted on a first meeting platform and the first client utilizes the first meeting platform. The first client receives media content from the collaborative meeting on behalf of the user. The proxy server then transmits the received media content to a second client on a computing device of the user that utilizes a different, second meeting platform.

According to another aspect of the present disclosure, a computer-implemented method comprises, joining, by a first local client and for a given user, a first collaborative meeting as a presenter, wherein the first client utilizes a first meeting platform. The method further comprises instructing a proxy server to separately join a set of collaborative meetings that includes the first collaborative meeting, on behalf of the given user, as a viewer. The first local client contributes media content from the given user to the first collaborative meeting. A second local client receives consolidated media content from the set of collaborative meetings via the proxy server. The consolidated media content includes the media content from the given user and from one or more additional contributors, and the second client utilizes a different second meeting platform.

According to another aspect of the present disclosure, a computing device comprises a communication interface in a proxy server, for communicating with computing devices of users, and with a collaborative meeting host providing a collaborative meeting on a first collaborative meeting platform. The computing device further comprises a controller in the proxy server. The controller is configured to join, using a first client, the collaborative meeting on behalf of a user, wherein the collaborative meeting is hosted on the first meeting platform and the first client utilizes the first meeting platform. The controller is further configured to receive, using the first client, media content from the collaborative meeting on behalf of the user. The controller is further configured to transmit the received media content to a second client on a computing device of a user that utilizes a different, second meeting platform.

According to another aspect of the present disclosure, a computing device comprises a communication interface for communicating with a proxy server, and with a collaborative meeting host providing a first collaborative meeting. The computing device further comprises a controller configured to join, using a first local client and for a given user, a first collaborative meeting as a presenter. The first client utilizes a first meeting platform. The controller is further configured to instruct a proxy server to separately join a set of collaborative meetings that includes the first collaborative meeting, on behalf of the given user, as a viewer. The controller is further configured to contribute, using the first local client, media content from the given user to the first collaborative meeting. The controller is further configured to receive, using a different second local client, consolidated media content from the set of collaborative meetings via the proxy server. The consolidated media content includes the media content from the given user and from one or more additional contributors, and the second client utilizes a different second meeting platform.

According to another aspect of the present disclosure, a computer program product comprises a computer readable storage medium having computer readable program code embodied therewith. The computer readable program code comprises computer readable program code configured to join, by a first client on a proxy server, a collaborative meeting on behalf of a user, wherein the collaborative meeting is hosted on a first meeting platform and the first client utilizes the first meeting platform. The computer readable program code further comprises computer readable program code configured to receive, by the first client, media content from the collaborative meeting on behalf of the user. The computer readable program code further comprises computer readable program code configured to transmit the received media content to a second client on a computing device of the user that utilizes a different, second meeting platform.

According to another aspect of the present disclosure, a computer program product comprises a computer readable storage medium having computer readable program code embodied therewith. The computer readable program code comprises computer readable program code configured to join, by a first local client and for a given user, a first collaborative meeting as a presenter, wherein the first client utilizes a first meeting platform. The computer readable program code further comprises computer readable program code configured to instruct a proxy server to separately join a set of collaborative meetings that includes the first collaborative meeting, on behalf of the given user, as a viewer. The computer readable program code further comprises computer readable program code configured to contribute, by the first local client, media content from the given user to the first collaborative meeting. The computer readable program code further comprises computer readable program code configured to receive, by a different second local client, consolidated media content from the set of collaborative meetings via the proxy server, wherein the consolidated media content includes the media content from the given user and from one or more additional contributors, and wherein the second client utilizes a different second meeting platform.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
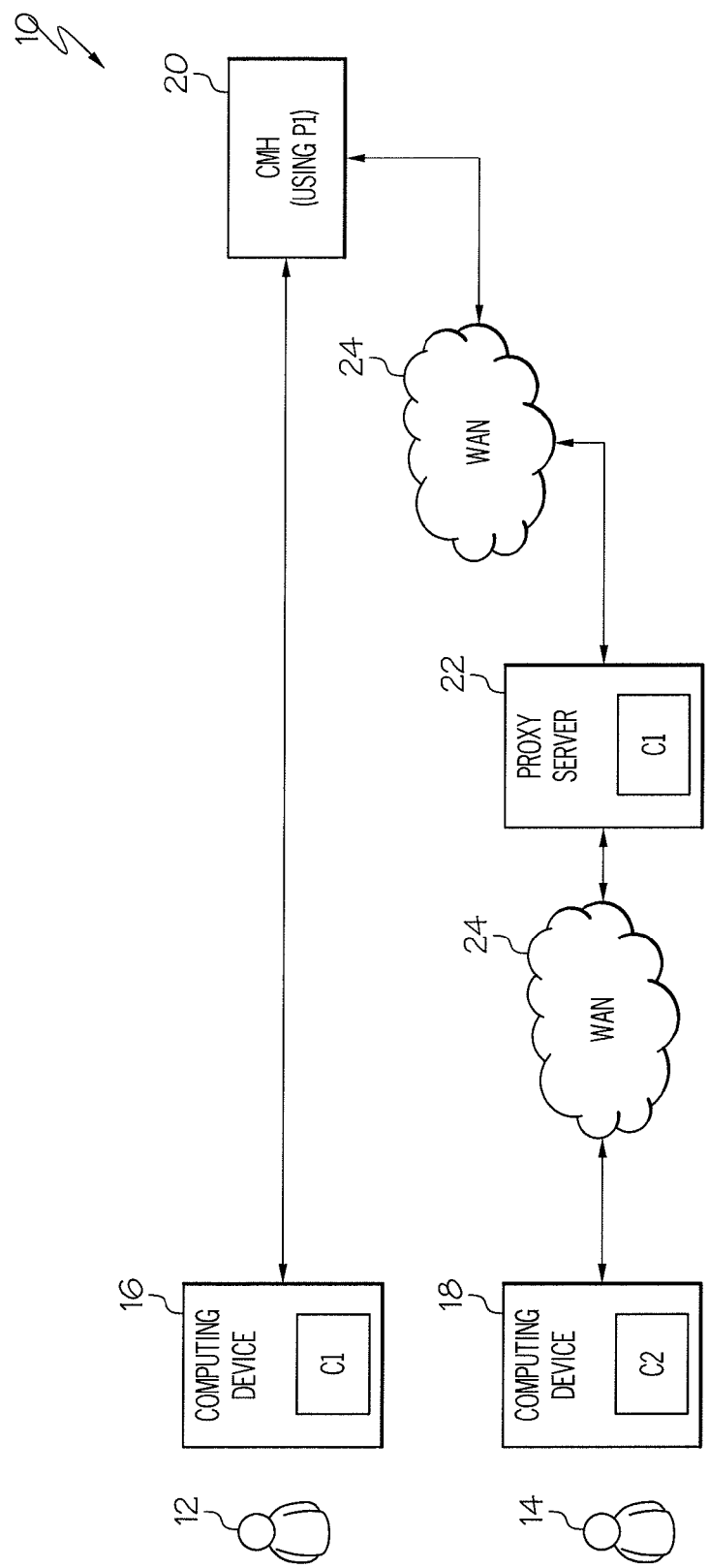
FIG. 1 is a picture of a collaborative meeting system.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method and apparatus for providing media content from a collaborative meeting to one or more users. The media content may include, for example, slides from a slide-based presentation. A proxy server is used to join a collaborative meeting on behalf of users, such that media content is received at the proxy server from the collaborative meeting on a first collaborative meeting platform, but is transferred to the computing device on a second collaborative meeting platform that is different from the first platform.

FIG. 1 illustrates a collaborative meeting system 10 in which a plurality of users 12, 14 use their respective computing devices 16, 18 to join a collaborative meeting provided by collaborative meeting host (CMH) 20. The computing devices 16, 18 may include desktop computers, laptop computers, tablets, or smartphones, for example. Throughout this application, a computing device being a computing device "of a user" indicates that the user utilizes the computing device to view content from a collaborative meeting. Thus, the computing device 16 is the computing device of user 12, and computing device 18 is the computing device of user 14. The CMH operates a first collaborative meeting software platform, and provides the collaborative meeting on the first platform (P1). User 12 joins the meeting using a native client C1 of P1 using their respective computing device 16. In one or embodiments the client C1 is plugin for a web browser.

User 14, in contrast, joins the collaborative meeting using a different second client C2 via proxy server 22. Client C2 operates on a different second collaborative meeting software platform (P2). The proxy server 22 supports multiple platforms including P1 and P2. The proxy server 22 joins the collaborative meeting of CMH 20 on behalf of the user 14 using its copy of the client C1 (using P1), but then transmits media content received from the CMH during the collaborative meeting to client C2 (using P2). In one or more embodiments the clients C1, C2 are plugins for a web browser, and/or are standalone applications (e.g., desktop applications or tablet/smartphone applications). Throughout this disclosure the nomenclature P1 and C1 will be used to refer to a first collaborative meeting platform and a client supporting that first platform. Likewise, P2 and C2 will be used to refer to a different second collaborative meeting platform and a client supporting that second platform, and P3 and C3 will similarly be used. However, it is understood that the C1 of a given figure isn't necessarily the same C1 of another figure. Instead, this notation is used to indicate a pairing between clients and platforms within a given figure.

Thus, if user 14 is unable to use P1, or simply prefers not to use P1, they can instead use P2 to obtain media content from the collaborative meeting. The proxy server communicates with the client C2 and with the CMH through a wide area network (WAN) 24, such as the Internet. In one or more embodiments, the proxy server 22 joint the collaborative meeting on behalf of the user 14 only as a passive viewer, such that the client C2 only receives media content as a "viewer" and does not enable the user 14 to transmit media content in the collaborative meeting as a "presenter." In such embodiments, the user 14 may receive the media content as a read-only web page (or read-only portion of an interactive webpage).

Figure 2:
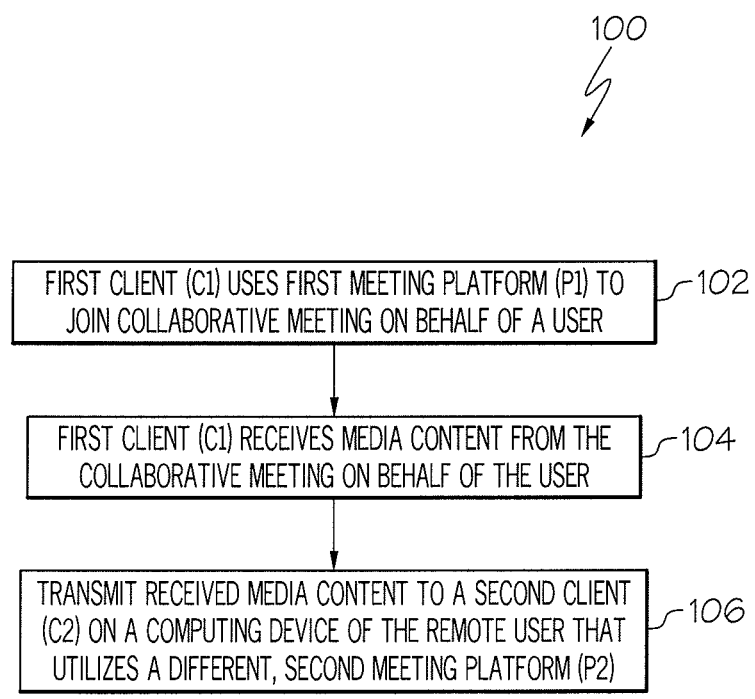
FIG. 2 is a block diagram of a computer-implemented method performed by a proxy server of FIG. 1.

FIG. 2 is a block diagram of a computer-implemented method 100 performed by the proxy server 22. The first client (C1) on the proxy server 22 uses the first meeting platform (P1) to join a collaborative meeting on behalf of user 14B (block 102). Client C1 receives media content from the collaborative meeting on behalf of the user 14 (block 104). The proxy server 22 then transmits the received media content to the second client C2 on the computing device 14 which utilizes the different, second platform P2 (block 106).

Figure 3:
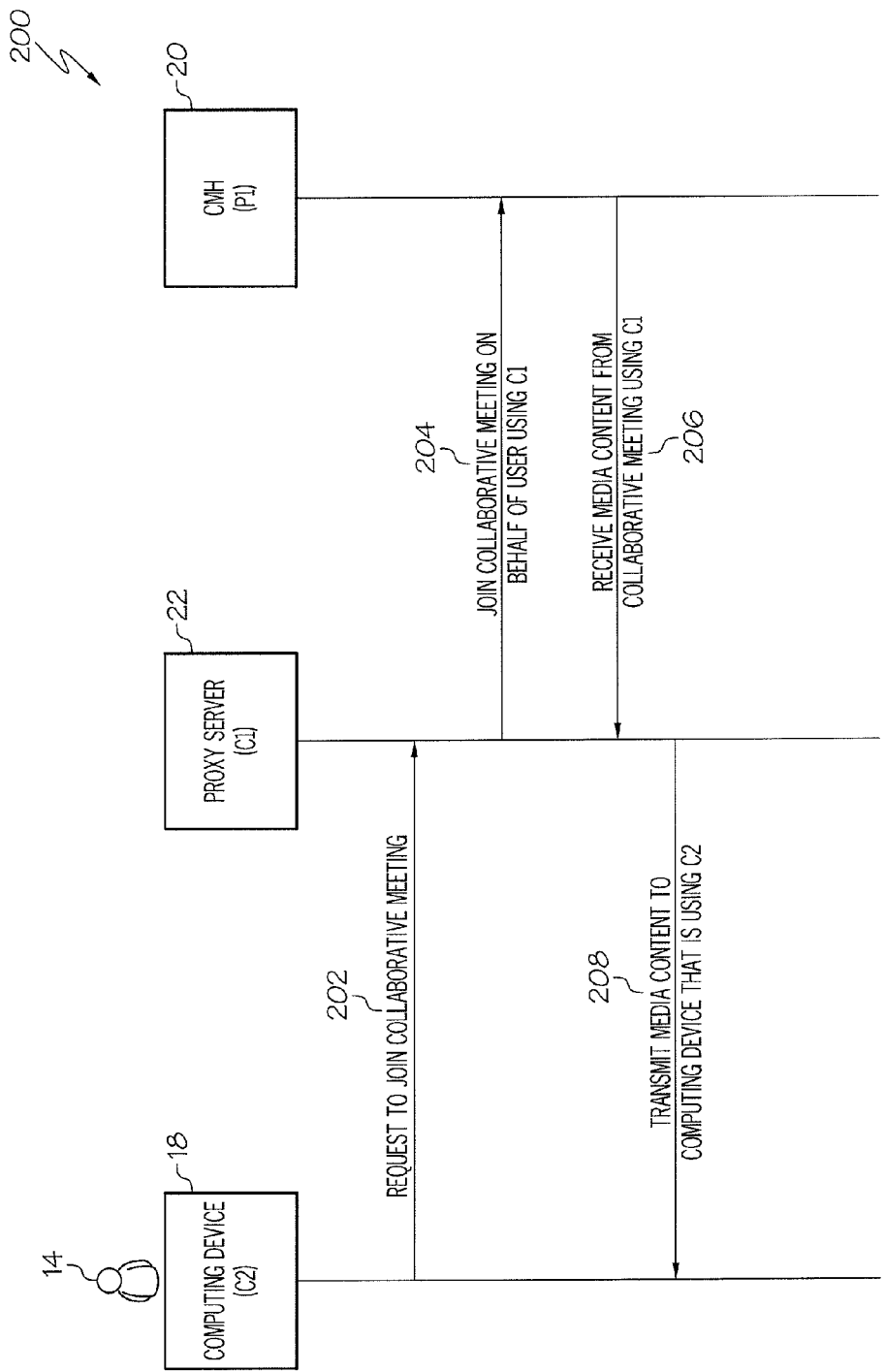
FIG. 3 is a signaling diagram illustrating the method of FIG. 2 according to one embodiment.

FIG. 3 is a signaling diagram 200 illustrating the method 100 according to one embodiment. Computing device 18 requests to join a collaborative meeting hosted by collaborative meeting host 20, which supports only C1 and P1 (step 202). Step 202 may include the computing device 18 providing credentials for the collaborative meeting (e.g., a username, URL, password, and/or a meeting code) at or shortly before a scheduled meeting time. Proxy server 22 joins the collaborative meeting on behalf of user 14 using C1 and P1 (step 204). The proxy server then receives media content from the collaborative meeting using C1 and P1 (step 206), and sends the media content to computing device 18 which is utilizing C2 and P2 (step 208). Steps 206 and 208 would then be repeated as necessary to transmit additional media content for the collaborative meeting. If C2 is a browser-based client, then step 208 in one or more embodiments comprises the proxy server 22 mapping frames of the media content onto a webpage that is refreshed whenever the context changes (e.g., when a new slide of a slide-based presentation is displayed) or with some defined periodicity.

Figure 4A:
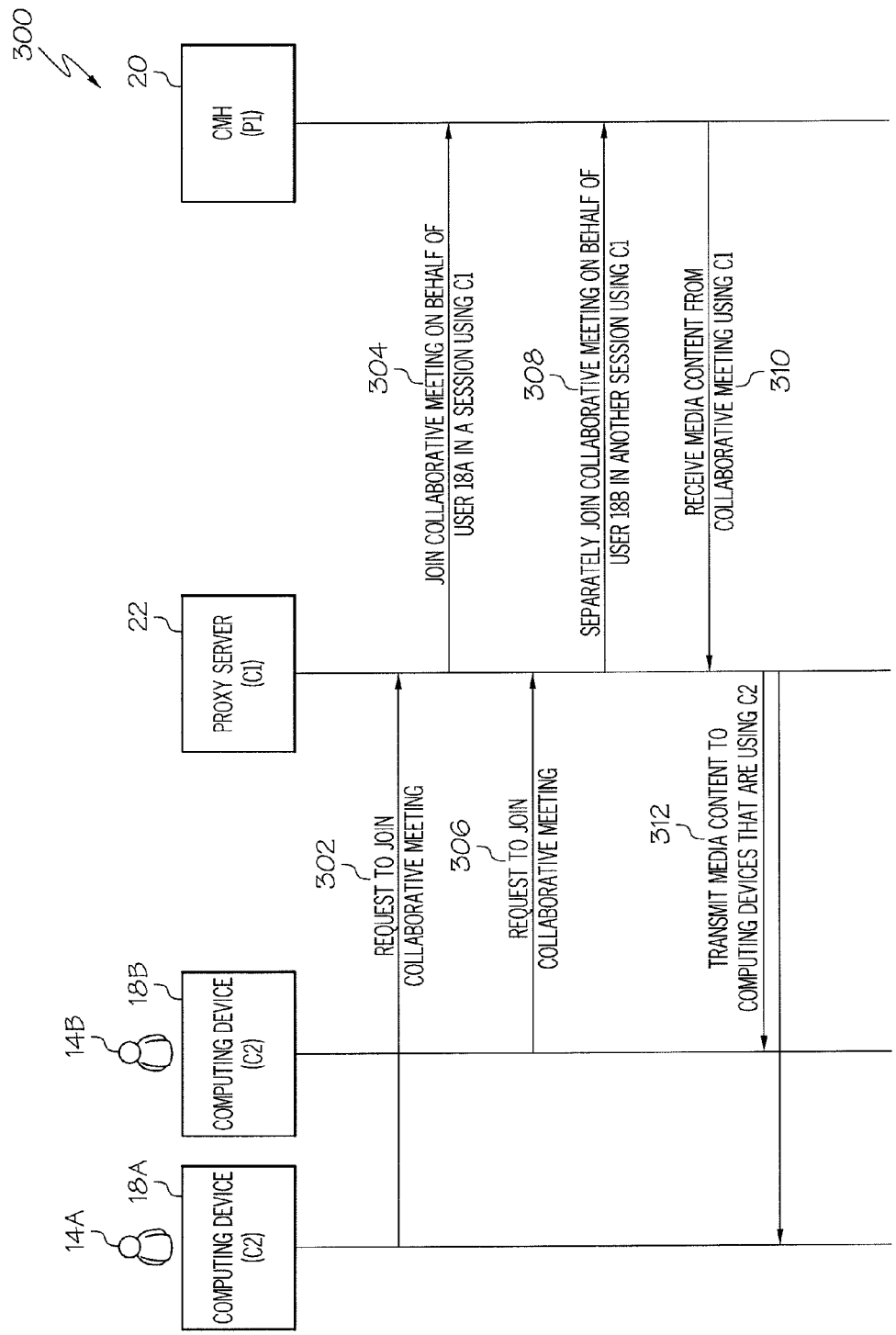
FIGS. 4A and 4B are signaling diagrams of embodiments where the proxy server joins a collaborative meeting on behalf of multiple users.
Figure 4B:
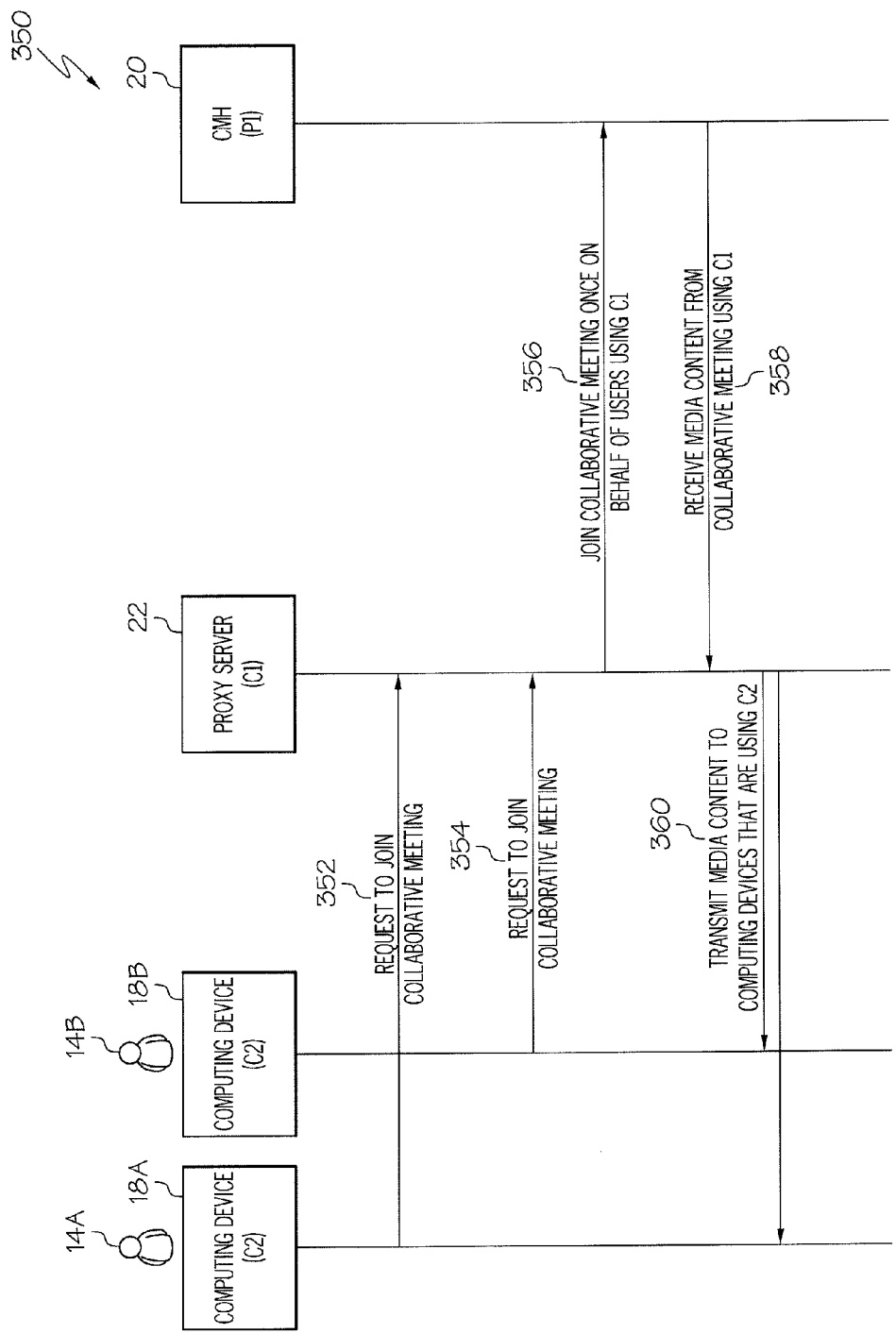

According to some embodiments the proxy server 22 may distribute media content from a collaborative meeting to multiple instances of a supported client for multiple users. FIGS. 4A and 4B illustrate embodiments where the proxy server 22 joins a collaborative meeting on behalf of multiple users 14A, 14B. Referring to FIG. 4A, user 14A requests that the proxy server 22 join a collaborative meeting on their behalf (step 302). The proxy server 22 joins the collaborative meeting supported by CMH 20 by establishing a session with the CMH 20 (step 304). User 14B requests that the proxy server 22 join a collaborative meeting on their behalf (step 306). The proxy server 22 joins the collaborative meeting supported by CMH 20 by establishing another session with the CMH 20 (step 308). Upon receiving media content from the collaborative meeting using C1 (step 310), the proxy server 22 transmits the media content to the computing devices 18A-B of users 14A-B which are each using C2 (step 312). Steps 310 and 312 would then be repeated as necessary to transmit additional media content for the collaborative meeting. Thus, in this embodiment a separate session is established with the CMH for each user (i.e., each user 14 connects to the collaborative meeting with their own instance of C1 on the proxy server 22).

FIG. 4B illustrates an alternate embodiment in which the proxy server 22 establishes a single session with the CMH 20 for multiple users. User 14A requests that the proxy server 22 join a collaborative meeting on their behalf (step 352). User 14B then requests that the proxy server 22 join a collaborative meeting on their behalf (step 354). The proxy server 22 joins the collaborative meeting supported by CMH 20 on behalf of both users 14A-B by establishing a single session with the CMH 20 using C1 (step 356). Upon receiving media content from the collaborative meeting using C1 (step 358), the proxy server 22 transmits the media content to the computing devices 18A-B of users 14A-B which are using C2 (step 360). Steps 358 and 360 would then be repeated as necessary to transmit additional media content for the collaborative meeting. Thus, in this embodiment a single session is established between C1 and the collaborative meeting on behalf of the multiple users 14A, 14B (i.e., each user logs into the collaborative meeting with a same instance of client C1).

Figure 5:
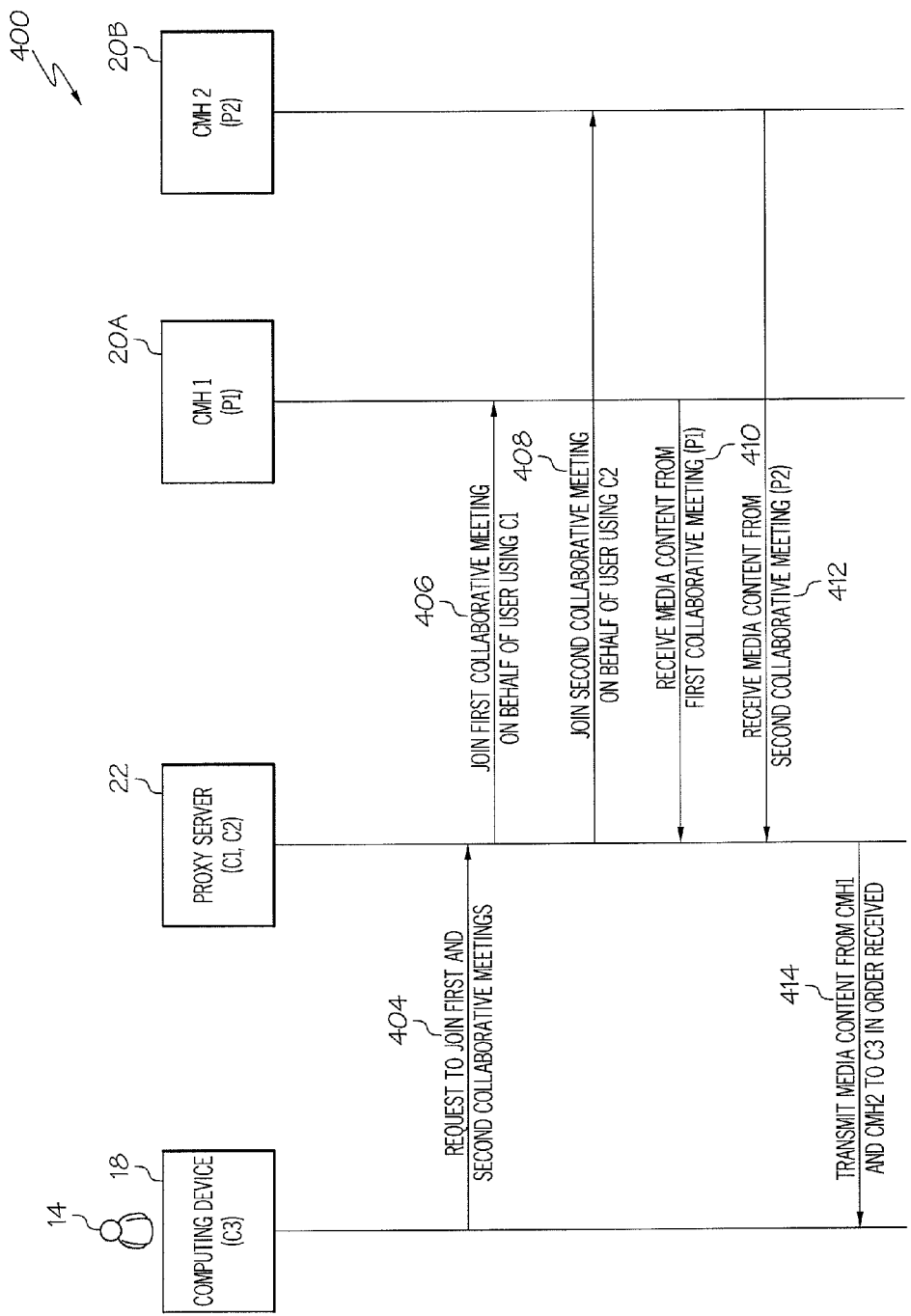
FIG. 5 is a signaling diagram of an embodiment in which the proxy server joins a set of collaborative meetings.

In one or more embodiments, the proxy server 22 is configured to join a set of collaborative meetings on behalf of a single user. The set of meetings may use the same or different collaborative meeting platforms. FIG. 5 illustrates a signaling diagram 400 of an embodiment in which the proxy server 22 joins a set of collaborative meetings. User 14 sends a request to proxy server 22 to join a set of collaborative meetings, including a collaborative meeting on platform P1 (provided by CMH1 20A) and a separate meeting on platform P2 (provided by CMH2 20B) (step 404). Responsive to this message, the proxy server 22 joins the P1 collaborative meeting with CMH1 20A on behalf of the user 14 using client C1 that supports platform P1 (step 406). The proxy server 22 also joins the P2 collaborative meeting with CMH2 20B on behalf of the user 14 using client C2 that supports platform P2 (step 408). The proxy server 22 receives media content from each of the respective collaborative meetings (steps 410, 412).

The proxy server 22 then transmits the media content from each of the collaborative meetings in the set to client C3 in the order in which the content was received, using a third platform P3 (step 414). Steps 410-414 would then be repeated as necessary to transmit additional media content for the collaborative meeting. In the embodiment of FIG. 5, step 414 comprises the proxy server 22 placing the media content in an outbound queue in the order in which it was received. In this regard, the proxy server 22 effectively consolidates the media content from the plurality of hosts 20A, 20B to form "consolidated media content" from the plurality of collaborative meetings (i.e., that of P1 and P2). Of course, although only two collaborative meetings are shown in the diagram 400, it is understood that this is only an example, and that the proxy server 24 could join any quantity of meetings on behalf of the user 14 at a given time, and could consolidate media content from all of those collaborative meetings.

Figure 6:
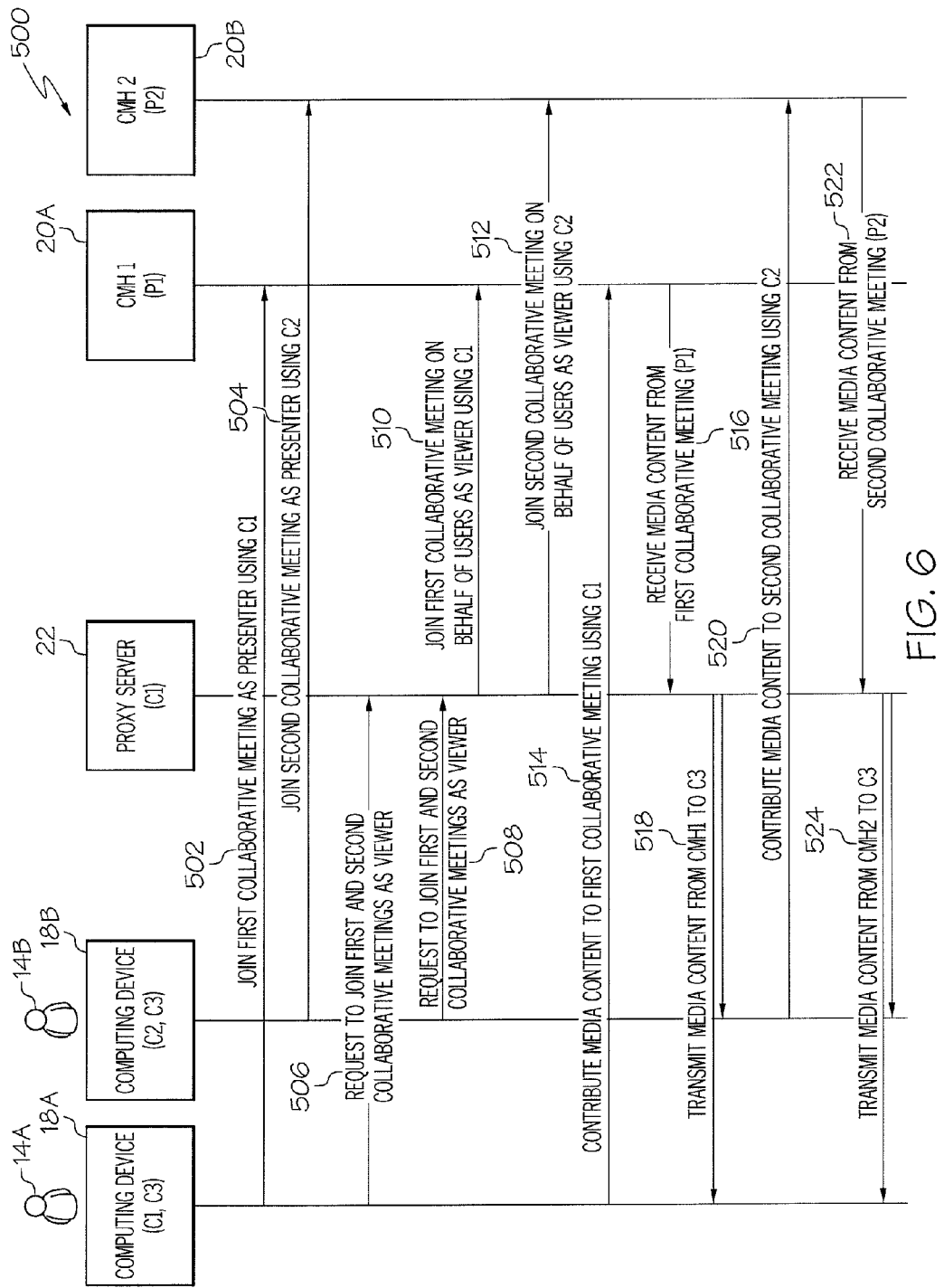
FIG. 6 is a signaling diagram of an embodiment in which multiple presenters use multiple collaborative meeting platforms.

FIG. 6 is a signaling diagram 500 of another embodiment, similar to that of FIG. 5, but in which multiple presenters use multiple collaborative meeting platforms. As discussed above, in one or more embodiments, the proxy server 22 joins the collaborative meeting on behalf of users 14A-B only as a passive viewer, such that the users 14A-B only receive media content as "viewers" through the proxy server 22. The embodiment of FIG. 6 illustrates how the proxy server 22 in such embodiments may be used to enable multiple presenters to use multiple presentation platforms.

Referring to FIG. 6, user 14A uses computing device 18A to directly join a collaborative meeting of host CMH1 as a presenter, using client C1 (step 502). User 14B uses computing device 18B to directly join a collaborative meeting of host CMH 2 as a presenter, using client C2 (step 504). Neither of the steps 502, 504 implicates the proxy server 22. User 14A then sends a request to the proxy server 22 to join the first and second collaborative meetings as a passive viewer on behalf of the user 14A (step 506). Similarly, user 14B sends a request to the proxy server 22 to join the first and second collaborative meetings as a passive viewer on behalf of the user 14B (step 508). The proxy server 22 then joins the first collaborative meeting on behalf of the users 14A-B using client C1 (step 510), and joins the second collaborative meeting on behalf of the users 14A-B using client C2 (step 512). In steps 510 and 512, the proxy server 22 joins the collaborative meetings in question as a viewer only (such that the users 14A, 14B cannot contribute media content through client C1, but can instead only receive media content through client C1 on the proxy server 22).

User 14A then contributes media content to the collaborative meeting using C1 (step 514). The proxy server 22 receives that media content from CMH1 (step 516), and transmits the content to both of users 14A and 14B, via their respective instances of client C3 (step 518). User 14B then contributes media content to the collaborative meeting using C1 (step 520). The proxy server 22 receives that media content from CMH2 (step 522), and transmits the content to both of users 14A and 14B, via their respective instances of client C3 (step 524). Thus, in this embodiment multiple presenters can transmit media content to a collaborative meeting using a first client (C1 or C2) and then receive that content, along with any other content from a set of associated collaborative meetings using a second client C3 via the proxy server 22. This may be advantageous if each presenting user has a preferred collaborative meeting client to use for presentations, and/or if each presenting user cannot use the other presenter's client (e.g., if C1 cannot operate on computing device 18B of user 14B).

Figure 7:
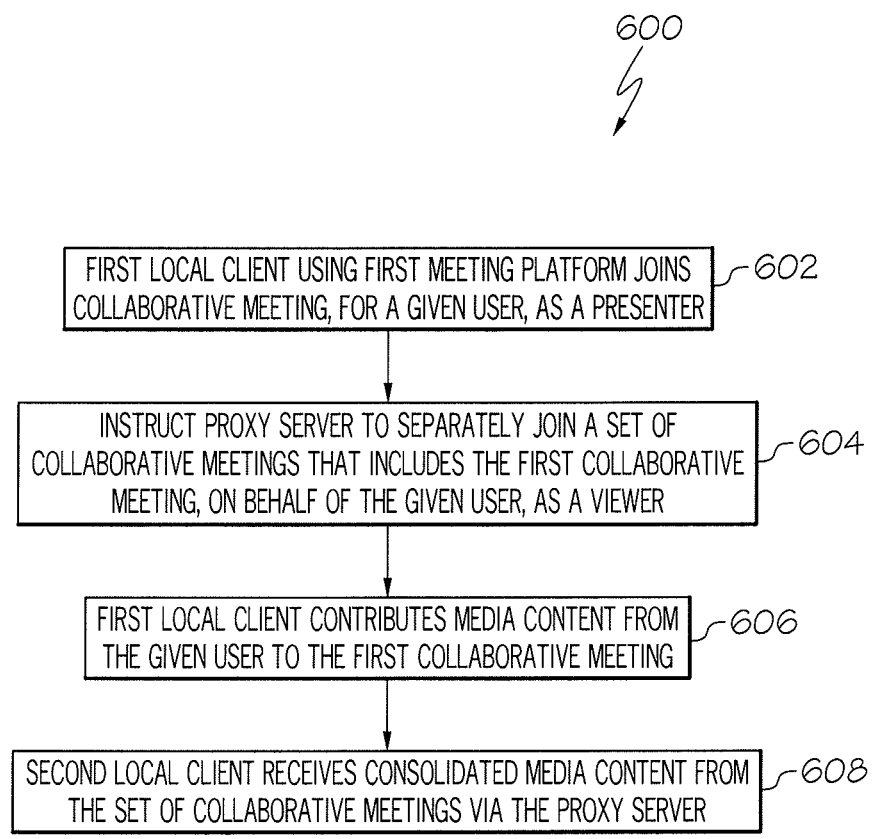
FIG. 7 is a block diagram of a computer-implemented method performed by a computing device of a collaborative meeting participant.

FIG. 7 is a block diagram of a computer-implemented method 600 performed by a remote computing device of a collaborative meeting participant. By way of example, this will be discussed in the context of user 14A and their computing device 18A from the signaling diagram 500 of FIG. 6. Computing device 18A uses client C1 (which supports platform P1) to join a first collaborative meeting for user 14A as a presenter (client C1 joins CMH1 meeting) (block 602). The computing device 18A then instructs proxy server 22 to separately join a set of collaborative meetings that includes the first collaborative meeting, on behalf of the given user 14A, as a viewer (block 604). Here the set of meetings includes the first and second collaborative meetings. The remote computing device 18A, via client C1, contributes media content from user 14A to the first collaborative meeting (block 606). The computing device 18A then uses a second client C3 (which supports platform P3) to receive consolidated media content from the set of collaborative meetings via the proxy server 22, with the consolidated media content including the media content contributed by user 14A and one or more additional contributors (e.g., user 14B) (block 608). Advantageously, this method allows presenters to use different collaborative meeting platforms but still effectively participate in a single consolidated meeting.

Figure 8:
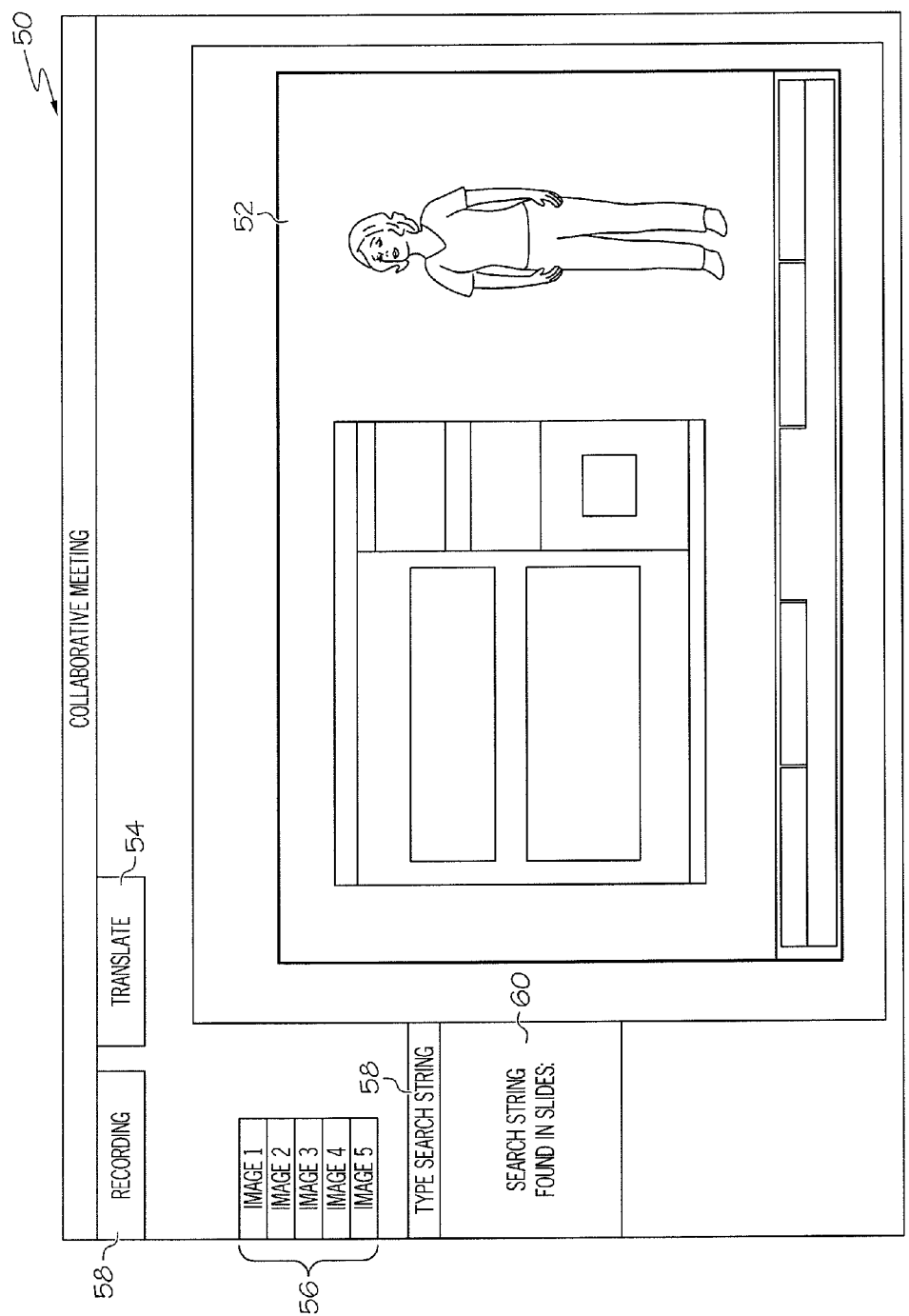
FIG. 8 illustrates an example display for shared media content of a collaborative meeting at a user computing device, as presented by the proxy server.

FIG. 8 illustrates an example display 50 of a collaborative meeting at computing device 18, as presented by the proxy server 22. The example embodiment of FIG. 8 includes searching, translation, and recording features. As shown in FIG. 8, a user 14 is presented with a current display of media content 52 from a collaborative meeting. The user 14 may select button 54 to translate a given piece of media content. In one or more embodiments, this may be used so that the user 14 dynamically receives a portion of translated media content before having received the portion of media content in untranslated form. In the same or other embodiments, the user 14 may instead choose to translate only selected portion(s) of media content after having received the selected portion(s) of media content in untranslated form.

In one or more embodiments the translation features of the proxy server 22 includes processing images and/or an audio stream of a collaborative meeting through text-recognition and/or audio-recognition technologies, and then presenting the resulting images and/or audio-stream to the user 14. In one or more embodiments the audio stream is obtained by the proxy server 22 dialing into an audio conference, such that the users 14 do not need to dial into the conference. In such embodiments, the recording features discussed above could also record the audio along with the unique frames of the image (and/or video) portion of the conference.

In one or more embodiments the proxy server 22 is configured to archive received media content in storage, and responsive to receiving a request for an archived portion of the media content from the computing device 18 of user 14, transmit the requested portion of the media content to the computing device 18 of the user 14 from the archive. This may be implemented using image links 56, with each link 56 corresponding to a previous portion of the media content, and with the links 56 collectively providing a complete or partial history of the collaborative meeting. In one or more embodiments the recording may be toggled with button 58. The image links 56 could facilitate moving back through previous view (e.g., slides) during a collaborative meeting.

In one or more embodiments, if audio was relayed and/or recorded in a collaborative meeting, the proxy server 22 could play back the collaborative meeting conference from the beginning potentially at a higher speed in order to "catch up" to a live conference. This could be useful if a user 14 joined a collaborative meeting after it had already commenced (i.e., after some media content had already been shared in the collaborative meeting).

In one or more embodiments, the proxy server 22 is configured to index the archived received media content for searching, and based on the indexing provide a search interface to facilitate searching of indexed media content. In the embodiment of FIG. 8 this search interface includes search field 58 and results area 60. Thus, the user 14 may enter a search query in the field 58, and the proxy server 22 would provide search results for a given collaborative meeting in area 60.

In one or more embodiments, the client of the proxy server 22 is configured for integration with remote user calendar tools. Using FIG. 3 as an example, in the illustrated embodiment client C2 is the client for remote users to receive media content from the proxy server 22. In one or more embodiments, C2 could be configured to work with a calendar tool, such as MICROSOFT OUTLOOK, to translate collaborative meeting information from platform P1 to platform P2. For example, if a URL to join a given collaborative meeting through P1 is http://www.abc.com/7443701317, then the client C2 may coordinate with the proxy server 22 to provide a new URL to join the meeting through P2, such as http://www.myconference.com/7443701317. The client C2 may be configured to automatically translate such URLs in Outlook (or other calendar tool) entries to simplify the process for joining collaborative meetings. Alternatively, or in addition to, URL translation, the client C2 may provide a similar translation feature upon request without implicating any calendar tools. In such embodiments, the translated link could be sent to a user 14 via email, instant message, or any other preferred method. Thus, in such embodiments, the translation may be provided using an email forwarding-rule, email-system plugin, or instant messaging plugin, such that the link would be translated from client C1 to client C2 as discussed above.

Figure 9:
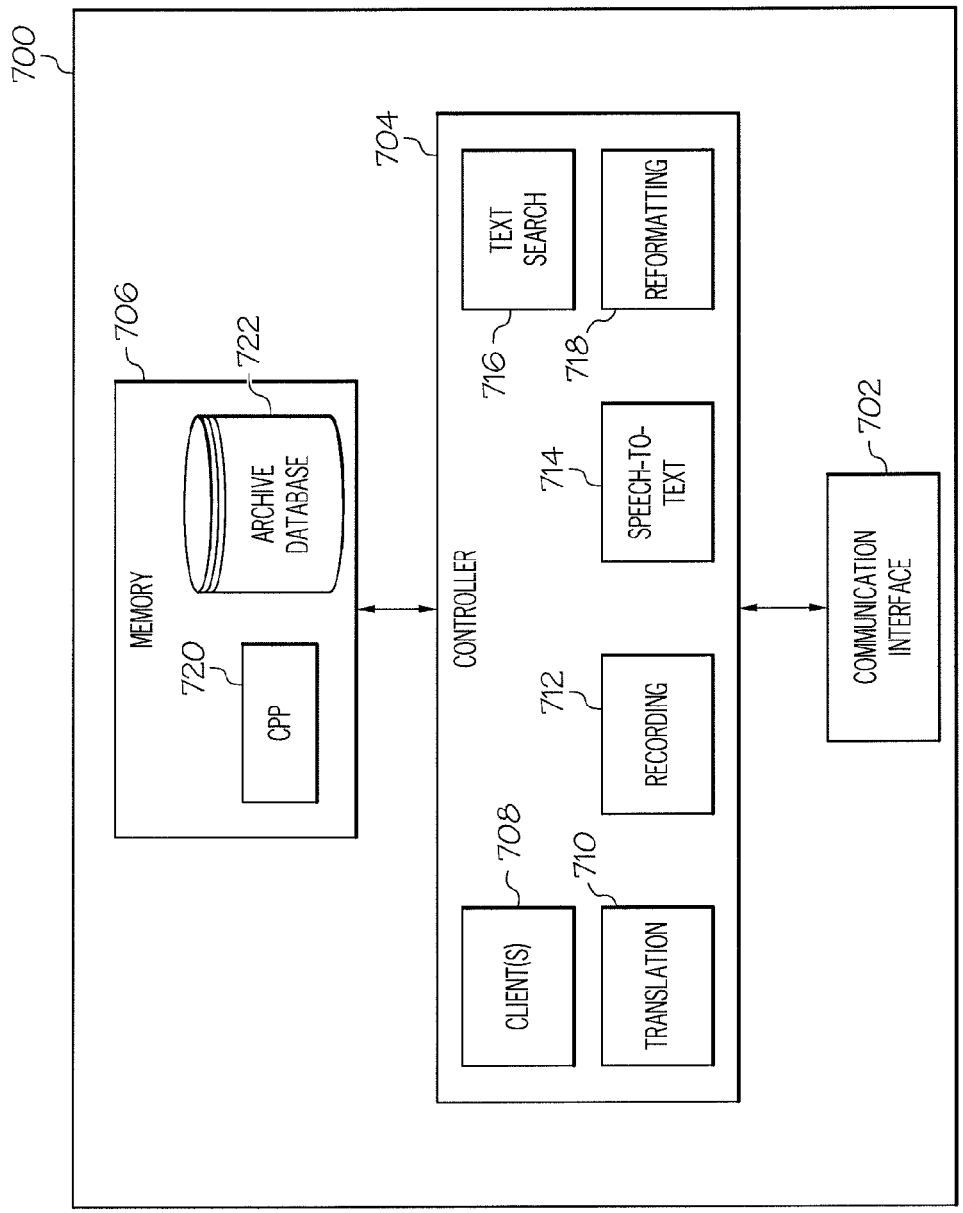
FIG. 9 is a block diagram of a proxy server.

FIG. 9 is a block diagram of an example computing device 700 configured as a proxy server 22. The computing device 700 includes a communication interface 702, a controller 704, and a computer-readable storage medium (shown as memory 706). The communication interface 702 is configured to communicate with computing devices 18 of users 14 and with at least one collaborative meeting host 20 providing a collaborative meeting on a first meeting platform P1. The controller 702 includes one or more processing circuits configured to join, using a C1 (see client unit 708), the collaborative meeting on behalf of the user 14, wherein the collaborative meeting is hosted on the platform P1 and the client C1 utilizes platform P1. The controller receives, using client C1, media content from the collaborative meeting on behalf of the user 14, and transmits the received media content to a second client C2 on computing device 18 of the user 14 that is utilizing a different, second meeting platform P2. In some embodiments the client unit 708 includes multiple clients (e.g., the embodiment of FIG. 5), with each client being operative to interact with a different collaborative meeting platform.

The controller 704 may optionally also include one or more of the following: a translation unit 710 operative to translate media content from a first language to a different second language, a recording unit 712 operative to archive media content in the memory 706, a speech-to-text unit 714 operative to convert audio media content to text form (e.g., for searching), a text search unit 716 operative to index archived media content and provide a searchable interface for searching the archived media content, and a reformatting unit 718 configured to reformat received media content according to user device and/or preferences. For example, referring to the example display 50 of FIG. 8, for some computing devices (e.g., smartphones and tablets) who have limited display sizes, everything outside of media content 52 may either be hidden and only revealed upon request (e.g., user touching a touchscreen display) or may be omitted entirely.

In one or more embodiments, the memory 706 includes a computer program product 720 containing computer readable program code operative to configure the computing device 700 according to one or more of the embodiments described above, and also includes an archive database 722 operative to store archived media content (from recording unit 712), and optionally to also store an index of archived media content.

Figure 10:
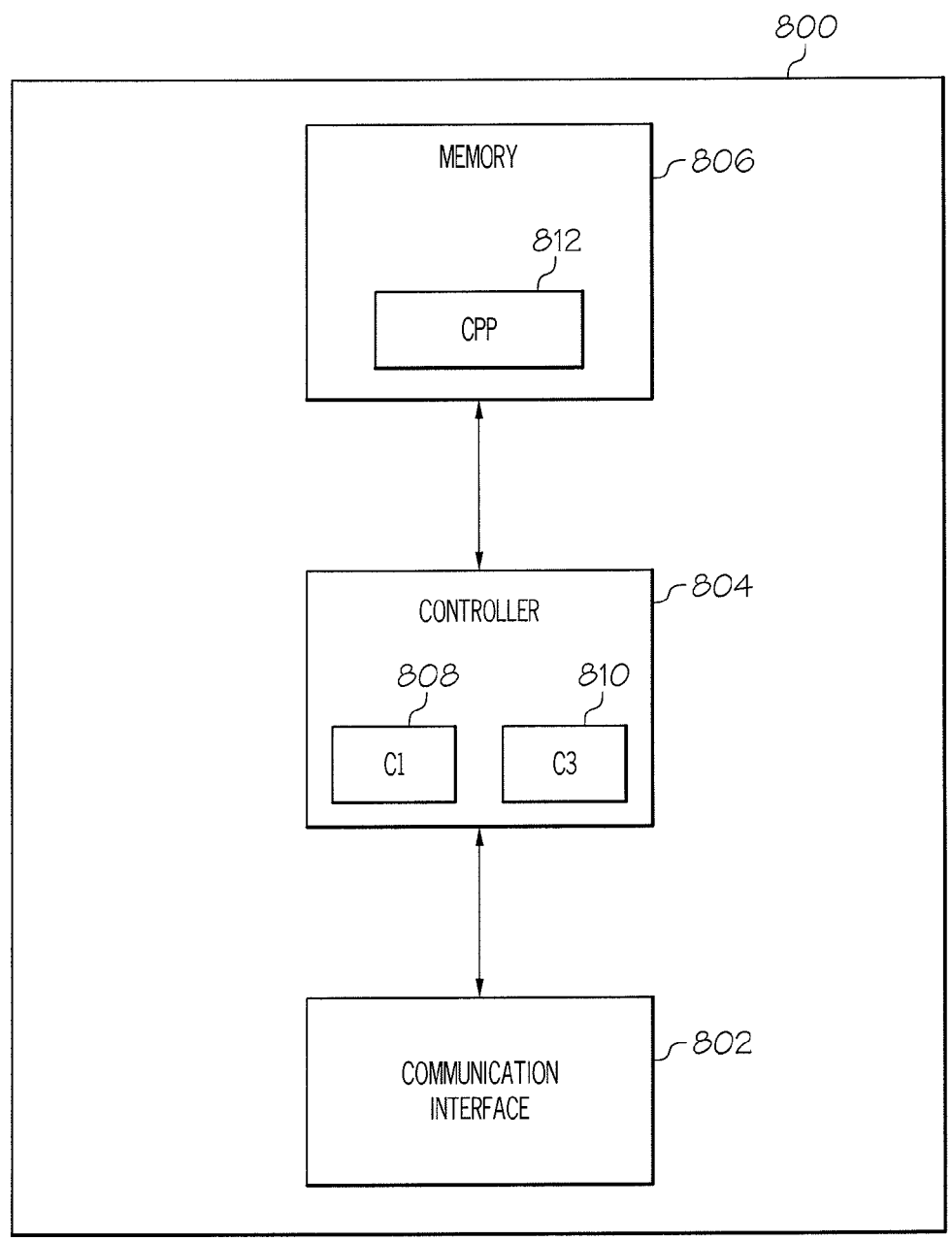
FIG. 10 is a block diagram of a user computing device.

FIG. 10 is a block diagram of an example computing device 800 configured as computing device 18 of user 14 (e.g., according to the embodiment of FIG. 6). The computing device 800 includes a communication interface 802, a controller 804, and a computer-readable storage medium (shown as memory 806). The communication interface 802 is configured to communicate with proxy server 22, and with a collaborative meeting host providing a first collaborative meeting (e.g., host CMH 1 of FIG. 6). The controller 804 is configured to use a first local client to join a first collaborative meeting for a given user as a presenter, wherein the first client utilizes a first meeting platform (see client C1 of client unit 808). The controller 804 is further configured to instruct proxy server 22 to separately join a set of collaborative meetings that includes the first collaborative meeting of host CMH 1, on behalf of the given user, as a viewer. The controller 804 is further configured to use the first local client to contribute media content from the given user to the first collaborative meeting, and to receive by a different second local client (see client C3 of client unit 810) consolidated media content from the set of collaborative meetings via the proxy server 22. The consolidated media content received by client C3 includes the media content contributed by the given user and by one or more additional contributors. In one or more embodiments, the memory 806 includes a computer program product 812 containing computer readable program code operative to configure the computing device 800 as described in the embodiment of FIG. 6.

The embodiments discussed above simplify collaborative meeting participation by allowing attendees to view a collaborative meeting without having to download or learn specialized collaboration tools (e.g., in the embodiment of FIG. 3 not requiring user 14 to download client C1). Additionally, the embodiments discussed above allow media content contributed to a collaboration meeting using tools that work primarily with a single operating system, to be viewed by users using other operating systems. In one or more embodiments, presenters are able to use their preferred collaborative meeting tool, such that differing presentation tools may be used for a set of collaborative meetings that are ultimately presented as a single set of consolidated media content.

Although slide-based presentations have been discussed as a possible type of media content to be shared in a collaborative meeting, it is understood that this is only one non-limiting embodiment. For example, in some embodiments video and/or audio content could be shared instead of static slides of a slide-based presentation. Also, during a slide-based presentation video and/or audio could be provided within the presentation (e.g., to illustrate a presenter marking up a slide) or a presenter switching from the slide-based presentation to simply sharing a view of their desktop.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   by a proxy server:
      receiving, from first and second different client computing devices, respective first and second requests to join a collaborative meeting hosted on a first collaborative meeting platform by a computer server that is different from the proxy server, wherein the first and second client computing devices are associated with respective first and second different users, and utilize a second collaborative meeting platform that is incompatible with the first collaborative meeting platform;
      joining the collaborative meeting on behalf of the first and second users responsive to receiving the respective first and second requests from the first and second different client computing devices, wherein joining the collaborative meeting on behalf of the first and second users comprises:
         aggregating the first and second requests into a single aggregated join request to join the collaborative meeting on behalf of the first and second users; and
         sending the aggregated join request to the computer server hosting the collaborative meeting on the first collaborative meeting platform;
      receiving media content from the computer server hosting the collaborative meeting on the first collaborative meeting platform;
      translating the media content from the first collaborative meeting platform to the second collaborative meeting platform; and
      transmitting the media content translated into the second collaborative meeting platform to both the first and second client computing devices.

2. The computer-implemented method of claim 1, further comprising:
   receiving credentials for the collaborative meeting from the first client computing device;
   wherein said joining the collaborative meeting on behalf of the first user is performed using the received credentials.

3. The computer-implemented method of claim 1, further comprising:
  transmitting the received media content to a third client computing device of a third user, wherein the third client computing device also utilizes the second collaborative meeting platform.

4. The computer-implemented method of claim 1, further comprising:
  joining, by the proxy server, an additional collaborative meeting on behalf of the first user, wherein the additional collaborative meeting is hosted on a third collaborative meeting platform that is different from the first and second collaborative meeting platforms, wherein the proxy server utilizes the third collaborative meeting platform to join the additional collaborative meeting; and
  receiving, by the proxy server, media content from the additional collaborative meeting on behalf of the first user, wherein the received media content from the additional collaborative meeting includes a view of a screen of a computing device of a third user that currently has a presenter role in the additional collaborative meeting;
  wherein transmitting the received media content to the first client computing device comprises transmitting the media content from each of the collaborative meetings in the order in which the media content was received.

5. The computer-implemented method of claim 1, further comprising:
  translating a portion of the received media content from a first language to a different second language;
  wherein said transmitting the received media content comprises transmitting the translated portion of the received media content.

6. The computer-implemented method of claim 5, wherein said translating a portion of the received media content is performed dynamically before the first user has received the portion of the received media content in untranslated form.

7. The computer-implemented method of claim 5, wherein said translating a portion of the received media content is performed upon request from the first user after the first user has already received the portion of the received media content in untranslated form.

8. The computer-implemented method of claim 1, further comprising:
  archiving the received media content in storage; and
  responsive to receiving a request for an archived portion of the media content from the first client computing device, transmitting the requested portion of the media content to the first client computing device from the storage.

9. The computer-implemented method of claim 8, further comprising:
  indexing the archived received media content for searching; and
  based on the indexing, providing a search interface to the first client computing device to facilitate searching of the indexed media content.

10. A computing device configured as a proxy server, the computing device comprising:
  a communication interface configured to communicate with client computing devices of users, and with a collaborative meeting host providing a collaborative meeting on a first collaborative meeting platform; and
  a processing circuit configured to:
    receive, from first and second different client computing devices, respective first and second requests to join the collaborative meeting hosted on the first collaborative meeting platform by a computer server that is different from the proxy server, wherein the first and second client computing devices are associated with respective first and second different users, and utilize a second collaborative meeting platform that is incompatible with the first collaborative meeting platform;
    join the collaborative meeting on behalf of the first and second users responsive to receiving the respective first and second requests from the first and second different client computing devices, wherein to loin the collaborative meeting on behalf of the first and second users, the processing circuit is configured to:
      aggregate the first and second requests into a single aggregated loin request to join the collaborative meeting on behalf of the first and second users; and
      send the aggregated join request to the computer server hosting the collaborative meeting on the first collaborative meeting platform;
    receive media content from the computer server hosting the collaborative meeting on the first collaborative meeting platform;
    translate the media content from the first collaborative meeting platform to the second collaborative meeting platform; and
    transmit the media content translated into the second collaborative meeting platform to both the first and second client computing devices.

11. The computing device of claim 10, wherein the processing circuit is further configured to:
  receive credentials for the collaborative meeting from the first client computing device; and
  use the received credentials when joining the collaborative meeting on behalf of the first user.

12. The computing device of claim 10, wherein the processing circuit is further configured to:
  transmit the received media content to a third client computing device of an additional user, wherein the third client computing device also utilizes the second collaborative meeting platform.

13. The computing device of claim 10, wherein the processing circuit is further configured to:
  join an additional collaborative meeting on behalf of the first user, wherein the additional collaborative meeting is hosted by an additional collaborative meeting host on a third collaborative meeting platform that is different from the first and second collaborative meeting platforms, wherein the processing circuit utilizes the third collaborative meeting platform to join the additional collaborative meeting; and
  receive media content from the additional collaborative meeting on behalf of the first user, wherein the received media content from the additional collaborative meeting includes a view of a screen of a computing device of a third user that currently has a presenter role in the additional collaborative meeting; and
  wherein to transmit the received media content to the first client computing device, the processing circuit is configured to transmit the media content from each of the collaborative meetings in the order in which the media content was received.

14. The computing device of claim 10, wherein the processing circuit is configured to:

translate a portion of the received media content from a first language to a different second language;

wherein to transmit the received media content to the first client computing device, the processing circuit is configured to transmit the translated portion of the received media content.

15. The computing device of claim 14, wherein the processing circuit is configured to translate the portion of the received media content dynamically before the first user has received the portion of the received media content in untranslated form.

16. The computing device of claim 14, wherein the processing circuit is configured to translate the portion of the received media content upon request from the first user after the first user has already received the portion of the received media content in untranslated form.

17. The computing device of claim 10, wherein the processing circuit is further configured to:
archive the received media content in storage; and
responsive to receiving a request for an archived portion of the media content from the first client computing device, transmit the requested portion of the media content to the first client computing device from the storage.

18. The computing device of claim 17, wherein the processing circuit is further configured to:
index the archived received media content for searching; and
based on the indexing, provide a search interface to the first client computing device to facilitate searching of the indexed media content.

19. A computer program product comprising:
a non-transitory computer readable storage medium comprising computer readable program code embodied therewith, that when executed by a processing circuit of a proxy server, controls the proxy server to:
receive, from first and second different client computing devices, respective first and second requests to join a collaborative meeting hosted on a first collaborative meeting platform by a computer server that is different from the proxy server, wherein the first and second client computing devices are associated with respective first and second different users, and utilize a second collaborative meeting platform that is incompatible with the first collaborative meeting platform;
join the collaborative meeting on behalf of the first and second users responsive to receiving the respective first and second requests from first and second different client computing devices, wherein joining the collaborative meeting on behalf of the first and second users comprises:
aggregate the first and second requests into a single aggregated loin request to join the collaborative meeting on behalf of the first and second users; and
send the aggregated join request to the computer server hosting the collaborative meeting on the first collaborative meeting platform;
receive media content from the computer server hosting the collaborative meeting on the first collaborative meeting platform;
translate the media content from the first collaborative meeting platform to the second collaborative meeting platform; and
transmit the media content translated into the second collaborative meeting platform to both the first and second client computing devices.

20. The computer program product of claim 19, wherein the computer readable program code further controls the proxy sever to:
receive credentials for the collaborative meeting from the first client computing device; and
use the credentials when joining the collaborative meeting on behalf of the first user.

21. The computer program product of claim 19, wherein the computer readable program code further controls the proxy sever to:
transmit the received media content to a third client computing device of a third user, wherein the third client computing device also utilizes the second collaborative meeting platform.

22. The computer program product of claim 19, wherein the computer readable program code further controls the proxy sever to:
join an additional collaborative meeting on behalf of the first user, wherein the additional collaborative meeting is hosted on a third collaborative meeting platform that is different from the first and second collaborative meeting platforms, wherein the proxy server utilizes the third collaborative meeting platform to join the additional collaborative meeting; and
receive media content from the additional collaborative meeting on behalf of the first user, wherein the received media content from the additional collaborative meeting includes a view of a screen of a computing device of a third user that currently has a presenter role in the additional collaborative meeting; and
transmit the media content from each of the collaborative meetings to the client computing device of the first user in the order in which the media content was received.

23. The computer program product of claim 19, wherein the computer readable program code further controls the proxy sever to:
translate a portion of the received media content from a first language to a different second language; and
transmit the translated portion of the received media content to the client computing device of the first user.

24. The computer program product of claim 23, wherein the computer readable program code further controls the proxy server to perform the translating dynamically before the first user has received the portion of the received media content in untranslated form.

25. The computer program product of claim 23, wherein the computer readable program code further controls the proxy server to perform the translating upon request from the first user after the first user has already received the portion of the received media content in untranslated form.

26. The computer program product of claim 19, wherein the computer readable program code further controls the proxy sever to:
archive the received media content in storage; and
responsive to receiving a request for an archived portion of the media content from the first client computing device, transmit the requested portion of the media content to the first client computing device from the storage.

27. The computer program product of claim 26, wherein the computer readable program code further controls the proxy sever to:
index the archived received media content for searching; and based on the indexing, provide a search interface to the first client computing device facilitate searching of the indexed media content.

28. A computer-implemented method comprising:

by a proxy server:
- receiving, from a client computing device, a request to join concurrent first and second collaborative meetings hosted on respective first and second collaborative meeting platforms, wherein the first and second collaborative meetings are incompatible with each other, and wherein the client computing device utilizes a third collaborative meeting platform that is incompatible with both the first and second collaborative meeting platforms;
- joining both the first and second collaborative meetings responsive to receiving the request to join first and second collaborative meetings, wherein joining the collaborative meetings comprises:
  - sending a first join request to the first collaborative meeting platform to join the first collaborative meeting on behalf of a user associated with the client computing device; and
  - sending a second different join request to the second collaborative meeting platform to join the second collaborative meeting on behalf of the user;
- receiving first media content from the first collaborative meeting platform and second media content from the second collaborative meeting platform;
- translating the first and second media content received from the first and second collaborative meeting platforms, respectively, to corresponding media content compatible with the third collaborative meeting platform utilized by the client computing device; and
- transmitting the corresponding media content compatible with the third collaborative meeting platform to the client computing device.

29. A computer-implemented method comprising:

by a proxy server:
- receiving, from first and second different client computing devices associated with corresponding first and second users, respective first and second requests to join both first and second collaborative meetings as viewers, wherein the first and second collaborative meetings are hosted concurrently on respective first and second collaborative meeting platforms that are incompatible with each other, and incompatible with one or more local collaborative meeting platforms utilized by the first and second client computing devices;
- joining both the first and second collaborative meetings on behalf of the first and second users, wherein joining the first and second collaborative meetings on behalf of the first and second users comprises:
  - aggregating the first and second requests into a first aggregated join request compatible with the first collaborative meeting platform;
  - aggregating the first and second requests into a second aggregated join request compatible with the second collaborative meeting platform, wherein the first and second join requests are different;
  - sending the first join request to the first collaborative meeting platform to join the first collaborative meeting on behalf of the first and second users as viewers using the first collaborative meeting platform; and
  - sending the second join request to the second collaborative meeting platform to join the second collaborative meeting on behalf of the first and second users as viewers using the second collaborative meeting platform;
- receiving first media content from the first collaborative meeting platform and second media content from the second collaborative meeting platform;
- translating the first and second media content received from the first and second collaborative meeting platforms to corresponding media content compatible with a third collaborative meeting platform utilized by the first client computing device;
- translating the first and second media content received from the first and second collaborative meeting platforms to corresponding media content compatible with a fourth collaborative meeting platform utilized by the second client computing device;
- transmitting the corresponding media content compatible with the third collaborative meeting platform to the first client computing device; and
- transmitting the corresponding media content compatible with the fourth collaborative meeting platform to the second client computing device.

* * * * *